(12) United States Patent  (10) Patent No.: US 7,871,006 B2
Morris et al.  (45) Date of Patent: Jan. 18, 2011

(54) TRIGGER UNIT FOR A WEARABLE DATA ACQUISITION DEVICE

(75) Inventors: Quintin Morris, Brooklyn, NY (US);
Kevin Cordes, Miller Place, NY (US);
Robert Liao, South Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 828 days.

(21) Appl. No.: 11/540,259

(22) Filed: Sep. 29, 2006

(65) Prior Publication Data

US 2008/0078837 A1   Apr. 3, 2008

(51) Int. Cl.
*G06K 7/10* (2006.01)
(52) U.S. Cl. .............................. 235/472.01; 235/462.44
(58) Field of Classification Search ............ 235/472.01, 235/472.02, 472.03, 462.44, 462.45
See application file for complete search history.

(56) References Cited

U.S. PATENT DOCUMENTS 5,124,960 A * 6/1992 Miller et al. ................. 368/278
5,319,185 A * 6/1994 Obata .................... 235/462.44

* cited by examiner

*Primary Examiner*—Karl D. Frech

(57) ABSTRACT

A detachable trigger unit for a wearable device (e.g., a wearable data acquisition device) includes (i) a trigger housing having a triggering mechanism for engaging a housing unit of the device; (ii) a strap housing detachably coupled to the trigger housing; and (iii) a protective membrane coupled to the strap housing and protecting a body part of a user. The trigger housing includes a first connector for receiving a corresponding second connector of the housing unit. The housing unit is rotatable about an axis substantially perpendicular to a bottom surface thereof.

24 Claims, 6 Drawing Sheets

US 7,871,006 B2

TRIGGER UNIT FOR A WEARABLE DATA ACQUISITION DEVICE

FIELD OF THE INVENTION

The present invention generally relates to trigger units for wearable devices and, in particular, to wearable data acquisition devices.

BACKGROUND INFORMATION

Conventional wearable data acquisition devices, such as ring scanners, often include an attachment arrangement integrally coupled to a housing thereof. The attachment arrangement is non-removable. In addition, a triggering mechanism is also integral with the housing and does not allow for ambidextrous operation of the data acquisition device. If the attachment arrangement or the trigger mechanism breaks, the entire device must be replaced.

SUMMARY OF THE INVENTION

A detachable trigger unit for a wearable device (e.g., a wearable data acquisition device) includes (i) a trigger housing having a triggering mechanism for engaging a housing unit of the device; (ii) a strap housing detachably coupled to the trigger housing; and (iii) a protective membrane coupled to the strap housing and protecting a body part of a user. The trigger housing includes a first connector for receiving a corresponding second connector of the housing unit. The housing unit is rotatable about an axis substantially perpendicular to a bottom surface thereof.

DETAILED DESCRIPTION

Figure 1:
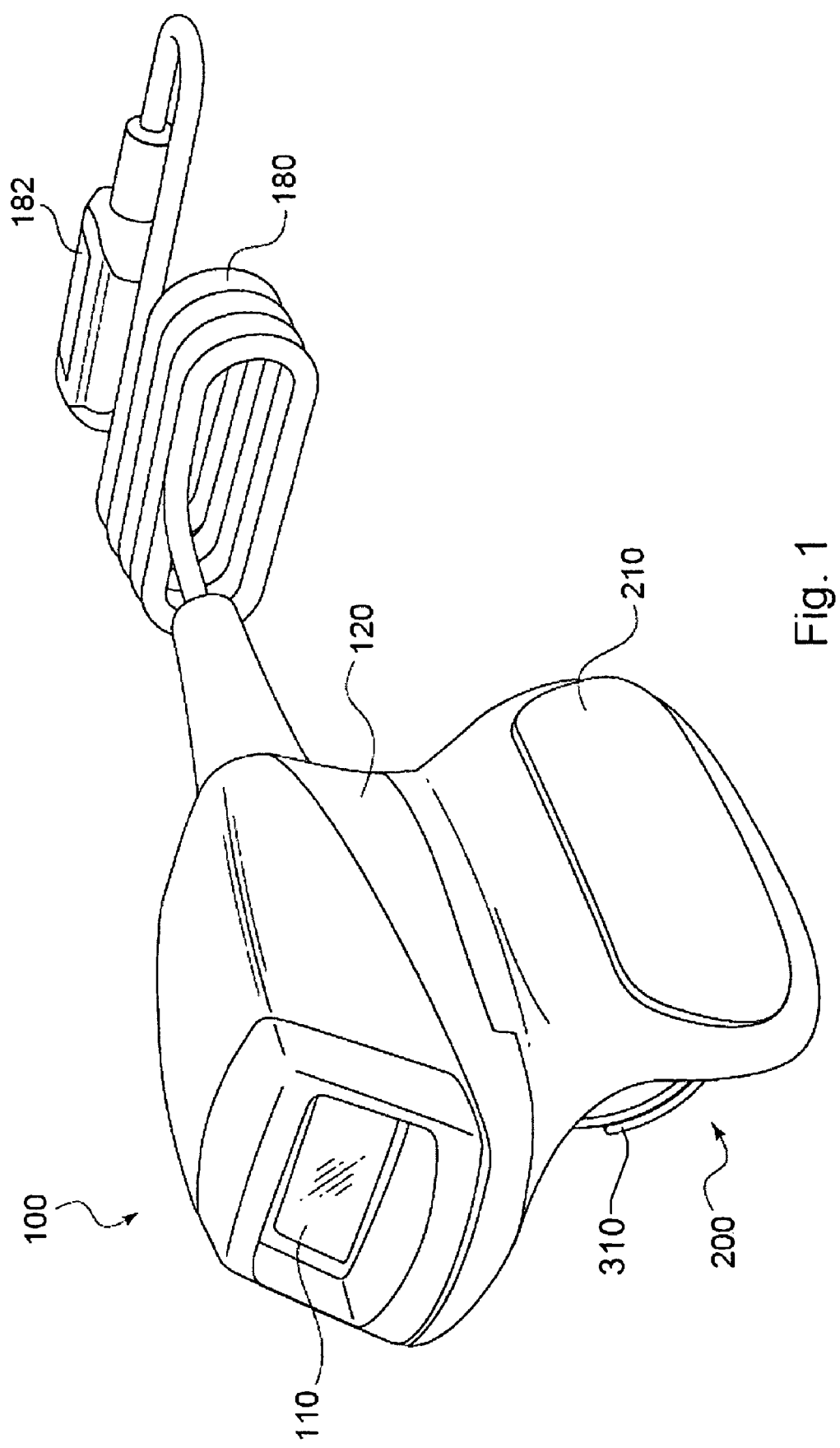
FIG. 1 is an exemplary embodiment of a wearable device according to the present invention.

The present invention may be further understood with reference to the following description and the appended drawings, wherein like elements are provided with the same reference numerals. The present invention relates to trigger units for wearable devices. An exemplary embodiment of the present invention is described with reference to a wearable data acquisition device such as a ring scanner, however those skilled in the art will understand that the present invention may be implemented with any type of wearable device, such as a wrist-mounted scanner, a glove scanner, etc. It will also be understood that the present invention is not limited to barcode scanners, but may also include RFID readers, laser-/image-based scanners, card readers and other types of wearable devices.

FIG. 1 shows an exemplary embodiment of a wearable device (e.g., a ring scanner) 100 according to the present invention. The scanner 100 includes a housing portion 120, which comprises a scanning arrangement (e.g., a barcode scanner) 110. The housing 120 may be coupled to a communication arrangement, such as data cable 180. The data cable 180 may transfer data to and/or from the scanner 100. For example, the data cable 180 may include a hardware connector 182 (e.g., a parallel port connector, a serial port connector, a USB connector, etc.) that couples the scanner 100 to a data storage device such as a computer, a PDA, a mobile terminal, etc. Thus, the data cable 180 may allow the scanner 100 to transmit scanned images to the data storage device and receive instructions therefrom.

The scanner 100 may also include a trigger unit 200 detachably coupled to the housing 120. The trigger unit 200 may comprise a ring that includes an adjustable strap assembly 310 for securing the scanner 100 to a body of a user. For example, the strap assembly 310 may be a Velcro® strap sized to fit around a finger of the user. In other embodiments, other types of attachment mechanisms, such as elastic bands, adhesives, snap enclosures, etc. may be utilized.

The trigger unit 200 includes a trigger portion 210, which may comprise any type of mechanical and/or electrical switch. For example, the trigger 210 may be a push button, a rocker switch, a slide switch, etc. In an exemplary embodiment, the trigger 210 may be a mechanical push button encased within a flexible membrane (e.g., a rubber cover). The trigger 210 is communicatively coupled to the housing 120. Thus, engaging the trigger 210 by depressing the flexible membrane activates the scanner 100, enabling a scanning of a barcode or another function. The coupling of the trigger 210 to the housing 120 will be described in detail below.

Figure 2:
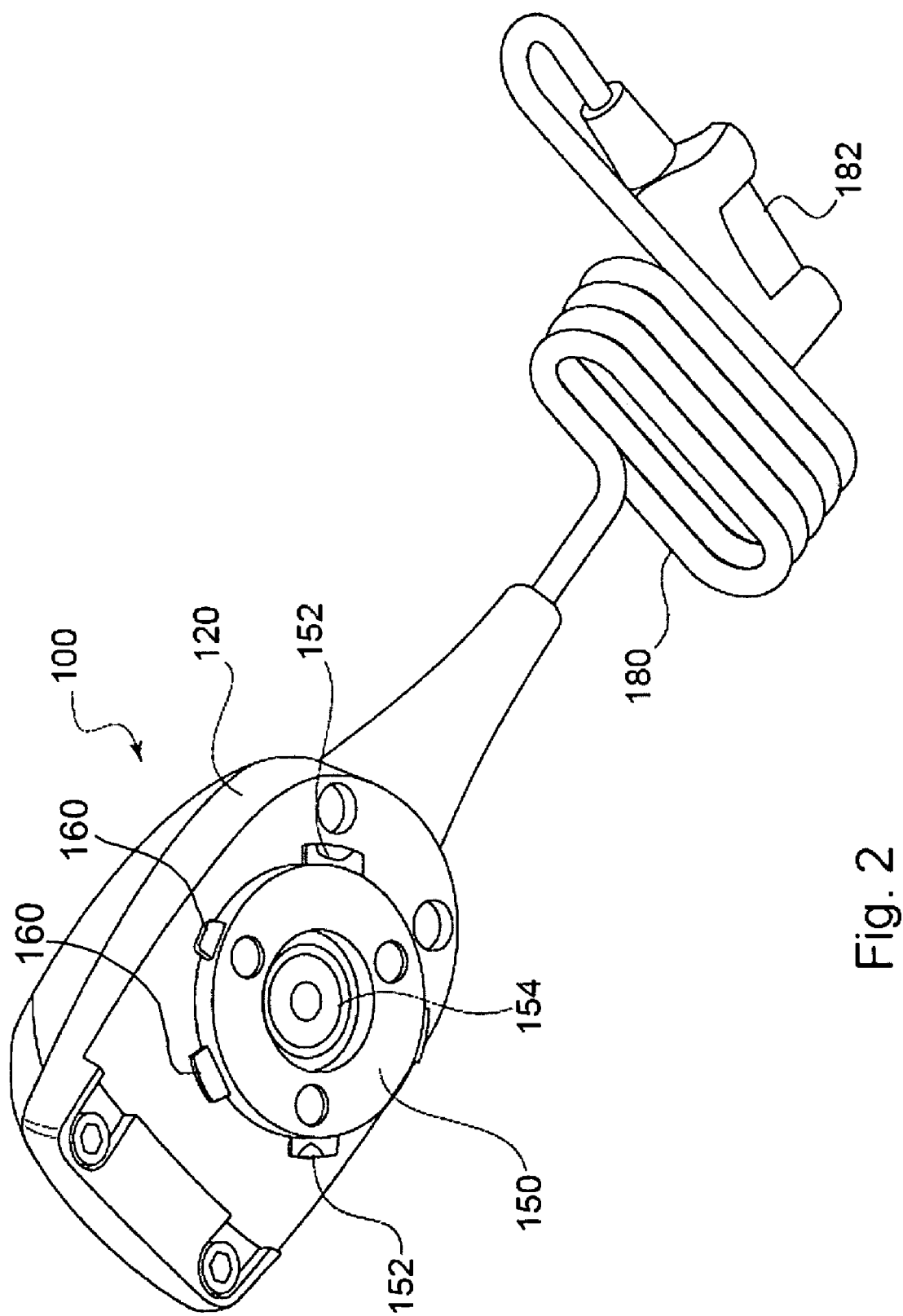
FIG. 2 is an exemplary embodiment of a housing unit of a mobile device according to the present invention.

FIG. 2 shows an exemplary embodiment of the scanner 100 in a detached configuration. The exemplary embodiment shown is a bottom view of the housing 120. A lower (e.g., base) portion of the housing 120 includes a mechanical connector 150 for attaching the trigger unit 200. The connector 150 may, for example, be a male connector shaped as a ring adapted for insertion into the trigger unit 200. The connector 150 may be formed of the same or substantially similar materials as the housing 120. For example, the connector 150 may be a hard plastic, a polymer, or any other substantially rigid material. An outer circumference of the connector 150 may include one or more tabs 160. As will be described below, the trigger unit 200 may be shaped to receive the tabs 160 when the housing 120 and the trigger unit 200 are aligned in a receiving configuration. One or more of the tabs 160 may include a recess or cut-out 152, which, in conjunction with a locking device, prevents movement of the housing 100 with respect to the trigger unit 200.

A triggering area 154 of the housing 120 is communicatively coupled to the trigger unit 200. When the trigger 210 is engaged, a mechanical and/or electrical connection between the trigger unit 200 and the triggering area 154 is established. For example, if the connection is the mechanical connection, the triggering area 154 may receive a shaft, a gear, etc. If the connection is the electrical connection, the triggering area 154 may receive an electrical contact, a wire, etc.

The connector 150 may cover a portion of the triggering area 154. In an exemplary embodiment, the connector 150 may, for example, circumscribe the triggering area 154, shielding the triggering area 154 from exposure. However, in other embodiments, the connector 150 may not cover the triggering area 154.

Figure 3:
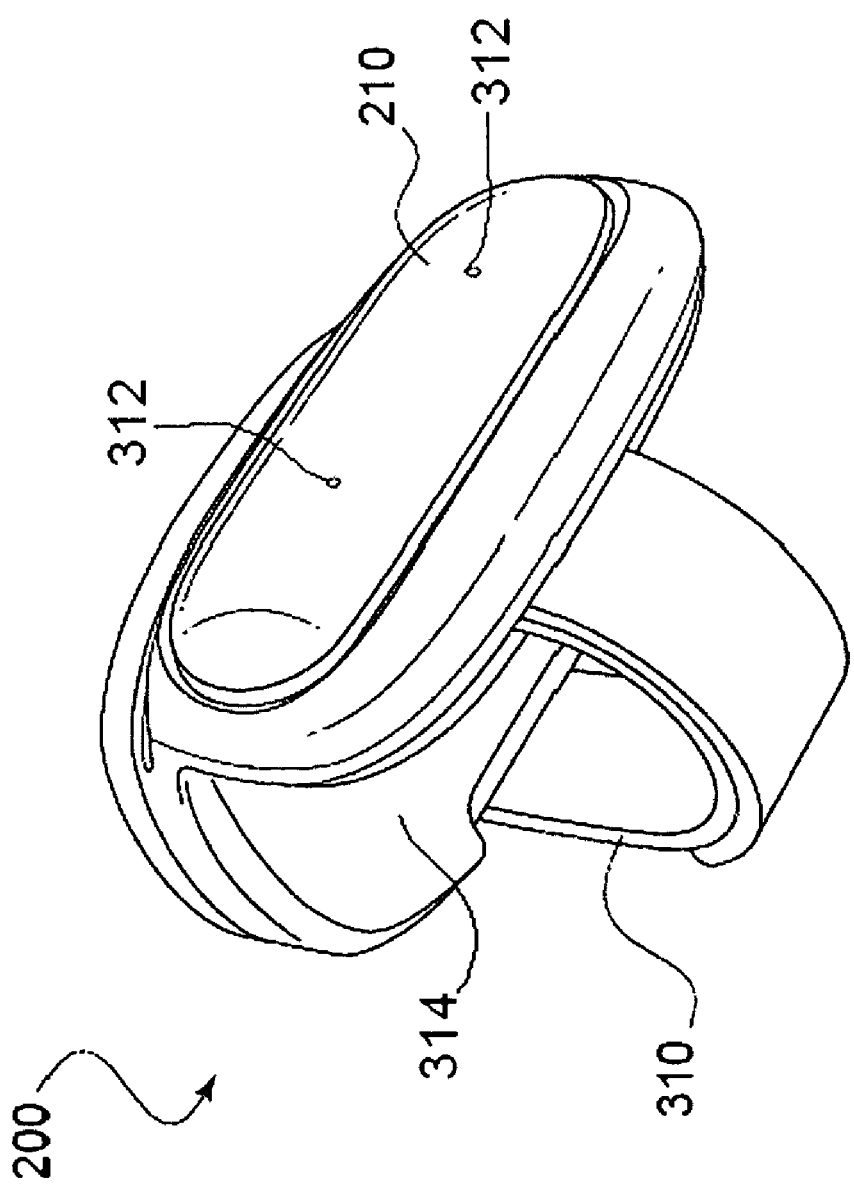
FIG. 3 is an exemplary embodiment of a trigger unit according to the present invention.

FIG. 3 shows an exemplary embodiment of the trigger unit 200 according to the present invention. The trigger unit 200 may be shaped to conform to the finger of the user. For example, an inner surface 314 of the trigger unit 200 may be partially or substantially cylindrical. In addition, the trigger unit 200 may be sized to allow for unrestricted movement (e.g., bending) of the finger. For example, a length of the trigger unit 200 may be substantially the same as a proximal phalanx of the finger. As will be described below, the trigger unit 200 is adapted to receive a protective membrane that shields a portion of the user's body (e.g., the user's finger) by functioning as a barrier between the finger and the inner surface 314 of the trigger unit 200.

Figure 4:
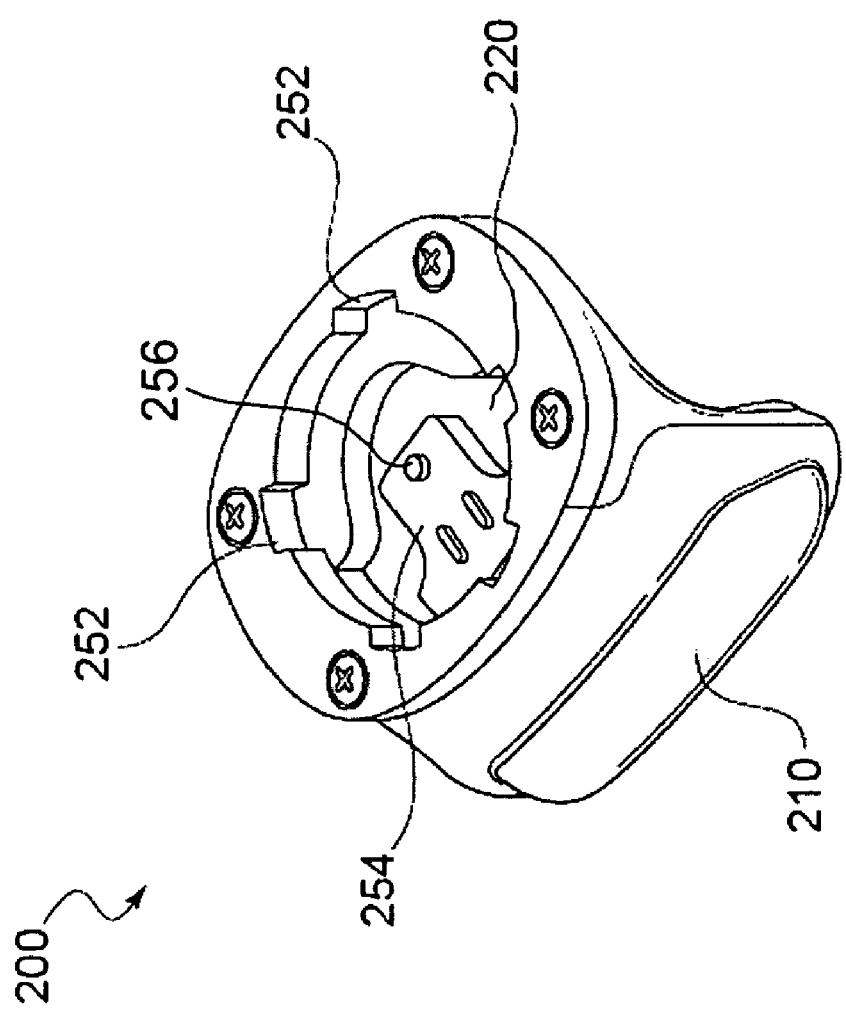
FIG. 4 is another view of the exemplary trigger unit of FIG. 3.

FIG. 4 shows an exemplary embodiment of a top view of the trigger unit 200. The trigger unit 200 may include a hollow portion 220 that receives the connector 150. The hollow portion 220 may include one or more slots 252 shaped to receive the tabs 160. Thus, the housing 100 may only be inserted into the hollow portion 210 if the tabs 160 are aligned with the slots 252. If the tabs 160 are not aligned, the housing 100 is prevented from insertion.

After the housing 100 is inserted, the trigger unit 200 may be secured using a locking device, such as a screw, a bushing, a dowel, etc. The locking device may be inserted via a port (e.g., a threaded hole) disposed on the interior surface 314. For example, if the locking device is the screw, it may be inserted through the port such that a shaft end of the screw extends beyond a lower surface of the tabs 160. In other embodiments, the port may be disposed elsewhere (e.g., a side of) on trigger unit 200. When the housing 100 is rotated in either a clockwise or counterclockwise fashion about an axis substantially perpendicular to a bottom surface of the base portion, the shaft end is eventually received within the recess 152 and the housing 100 is prevented from further rotation. Thus, rotational motion may be constrained to prevent the tabs 160 from becoming aligned with the slots 252 and the housing 100 cannot be detached from the trigger unit 100. If detachment is desired, the locking device may be removed (e.g., by unscrewing). The housing 100 may then be rotated until the tabs 160 and the slots 252 are aligned, and the trigger unit 200 separated.

The hollow portion 220 may include a trigger mechanism (e.g., a trigger plate 254). The trigger plate 254 is activated by engaging the trigger 210 and may include a nub 256. Activation may result in pivoting of the trigger plate 254 about a longitudinal axis of the trigger unit 200. This pivoting action causes the nub 256 to be elevated above the hollow portion 220 and contact the triggering area 154. When the trigger 210 is disengaged, the trigger plate 254 returns to a resting position within the hollow portion 220.

Figure 5:
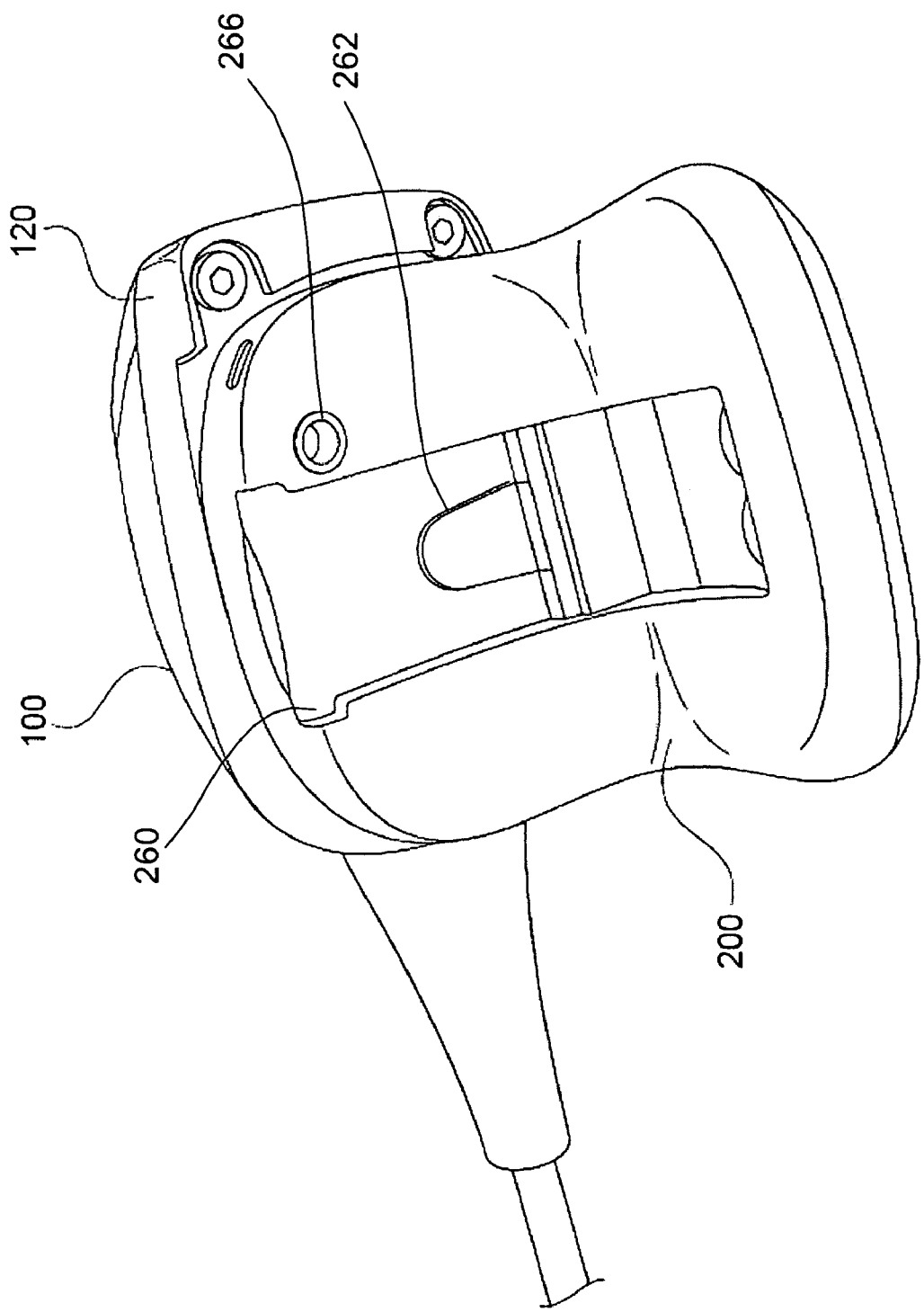
FIG. 5 is another view of the exemplary trigger unit of FIG. 3.

FIG. 5 shows an exemplary embodiment of a bottom view of the trigger unit 200 in which the strap assembly 310 has been detached. As shown in FIG. 5, the inner surface of the trigger unit 200 includes a receiving arrangement (e.g., a receiving recess 260) shaped for receiving the strap assembly 310. The receiving arrangement may further comprise a contoured surface including one or more grooves 262 into which the strap assembly 310 is mated. In an exemplary embodiment discussed below with reference to FIG. 6, the groove 262 comprises part of a snap-locking arrangement. However, it will be understood that any conventional attachment arrangement (e.g., adhesive, friction fit, Velcro®, magnets, etc.) may be utilized. The inner surface may also include a port 266 for inserting the locking device.

Figure 6:
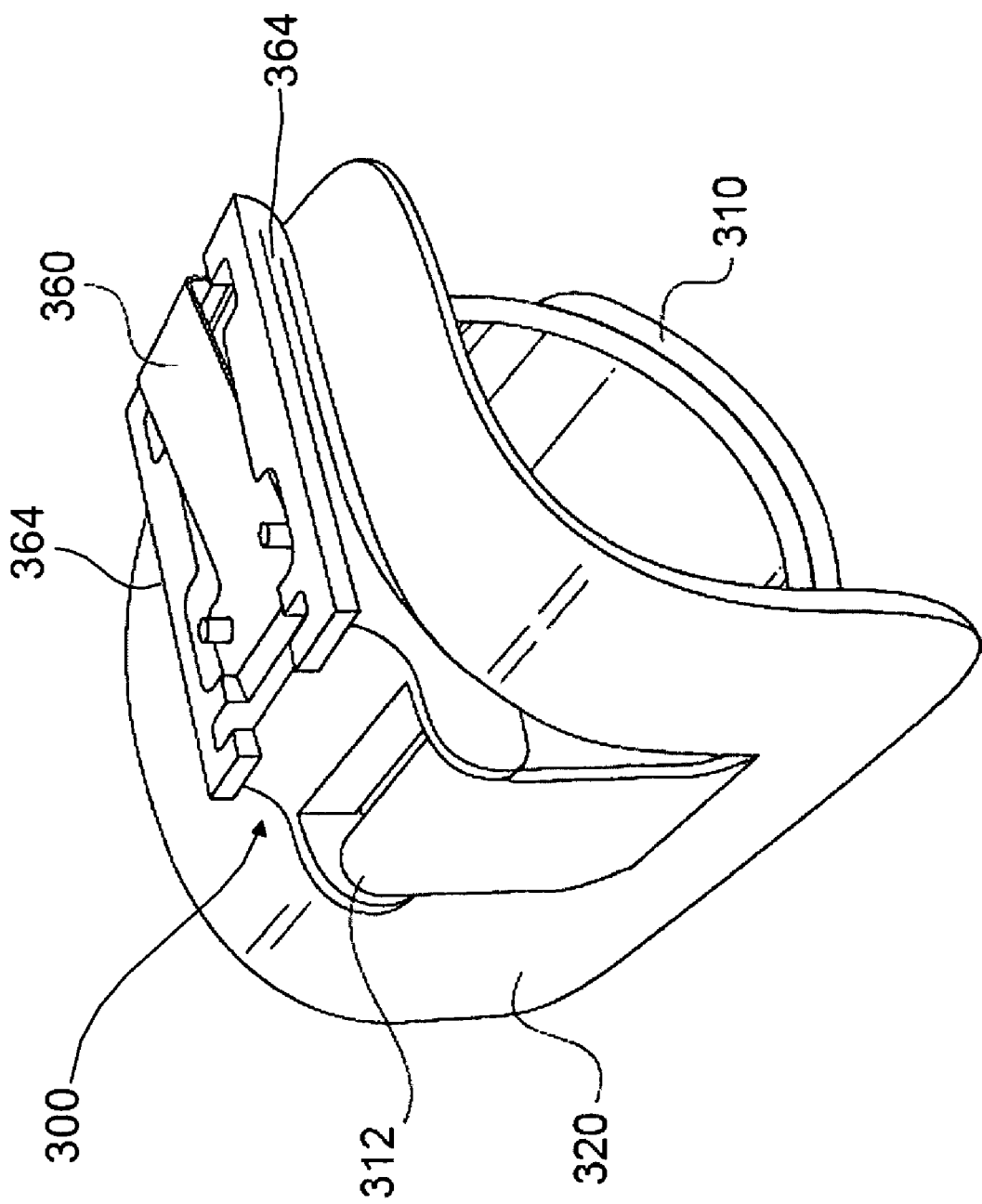
FIG. 6 is an exemplary embodiment of a protective membrane according to the present invention.

FIG. 6 shows an exemplary embodiment of a protective membrane 320 according to the present invention. The protective membrane 320 is a curved sheet that substantially conforms to the inner surface 314 of the trigger unit 200, extending over the trigger 210. As shown in FIG. 6, the protective membrane 320, along with the strap assembly 310, are attached to a strap housing 300. The strap assembly 310 may be attached to the strap housing 300 by looping around a bar 312. However, other attachment methods such as heat welding, adhesives and Velcro® may be utilized in other embodiments. The protective membrane 320 may be formed of a flexible rubber, plastic, or any other suitable material. In an exemplary embodiment, the protective membrane 320 is a formed of a self-healing polymer that is activated in response to damage (e.g., ripping, punctures, cracks, etc.). However, it will be understood that any material capable of protecting against injury (e.g., cuts, abrasions, etc.) may be utilized. A surface of the protective membrane 320 is substantially smooth. However, a texture of the surface of the protective membrane 320 may be varied to produce a desired friction level between the protective membrane 320 and the user's finger. For example, if a high friction level (e.g., a gripping surface) is desired, the texture may be substantially granular and/or textured (e.g., ridged, grooved, etc.). If a low friction level (e.g., a comfort surface) is desired, the texture may be substantially smooth. A length of the protective membrane 320 is substantially the same as that of the trigger unit 200. Thus, the protective membrane may completely separate the user's finger from contact with the inner surface of the trigger unit 200. A thickness of the protective membrane 320 may be varied according to user preference and/or desired physical properties. For example, membranes of varying thicknesses may be produced to allow the user to select a membrane of a particular thickness. Those of skill in the art will understand that the thickness may be varied according to physical properties such as flexibility, tensile strength, shearing strength, etc. The membrane is also a hygiene barrier which isolates the user from the ring. The strap assembly can be given out to individual users. Individual users can use their own strap assembly with communal rings, limiting their exposure to germs and bacteria. The membrane material can also be formed out of hygienic materials that resist the growth of bacteria.

In the exemplary embodiment, the protective membrane 320 is removably attached to the strap housing 300 via an adhesive, Velcro®, friction fitting, or another conventional method. In other embodiments, the protective membrane 320 may be permanently attached. The protective membrane 320 and the strap assembly 310 may be attached to the strap housing 300 prior to attaching the strap housing 300 to the trigger unit 200. However, it may also be possible to attach the protective membrane 320 and/or the strap assembly 310 after the strap housing 300 is coupled to the trigger unit 200.

As seen in FIG. 6, the strap housing 300 may comprise a snap-locking arrangement including a locking plate 360. The locking plate 360 may be formed of a flexible metal or plastic with spring-like characteristics. In an initial configuration, the locking plate 360 may be angled, extending upward from the strap housing 300. The strap housing 300 may be attached to the trigger unit 200 by sliding the strap housing 300 towards the trigger 210. The sliding causes the locking plate 360 to deflect downwards into a locked configuration in which the strap housing 300 is secured to the trigger unit 200. The strap housing 300 may be released by sliding the strap housing 300 away from the trigger 210, which returns the locking plate 360 to the initial configuration, decoupling the trigger unit 200 and the strap housing 300. In other embodiments, the locking plate 360 may be coupled to a release mechanism, such as, for example, a release tab.

FIG. 6 also shows one or more ribs 364 that engage the receiving recess 260. The ribs 364 may be disposed along opposing sides of the strap housing 300 and engage the receiving recess 260 when the strap housing 300 is slid towards the trigger 210. The ribs 364 and any other attachment features of the strap housing 300 could be implemented on a terminal, allowing the user a place to store the trigger unit 200 when it is not being worn. This could allow the user to add scanning abilities to a terminal that did not have it. As a receiving interface, the receiving recess 260 and ribs 364 afford the user with another accessory attachment point.

The exemplary embodiments of the trigger unit 200 described above provide several advantages. In addition to being easily configured for left-handed and right-handed operation, the trigger unit 200 is replaceable and may be compatible with a plurality of data acquisition devices that have different functions. The user may customize the trigger unit 200 by selecting a protective membrane of appropriate size, thickness, texture, etc. and use the trigger unit 200 in conjunction with the plurality of data acquisition devices. In addition, each major component of the trigger unit 200 may be replaceable. Thus, if the strap assembly 310 or the protective membrane 320 becomes worn or broken, a new strap/membrane may be added. Furthermore, this arrangement allows the strap assembly 310 and the protective membrane to be cleaned (e.g., washed, sanitized) between uses.

The above-described advantages of the present invention are not possible with wearable devices which utilize integral triggering mechanisms. In addition, the present invention is cost-effective, since the components of, or the trigger unit itself, are replaceable. For example, the scanner 100 need not replaced if a component breaks.

The present invention has been described with reference to the above exemplary embodiments. One skilled in the art would understand that the present invention may also be successfully implemented if modified. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A detachable trigger unit for a wearable device, comprising:
    a trigger housing including a triggering mechanism for triggering a function of the wearable device, the trigger housing being rotatable relative to the wearable device;
    a strap assembly detachably coupled to the trigger housing; and
    a protective membrane coupled to the strap assembly for protecting a body part of a user.

2. The trigger unit of claim 1, wherein the strap assembly includes an adjustable strap removably coupled thereto.

3. The trigger unit of claim 1, wherein the trigger housing is adapted to receive a locking device that maintains the trigger housing in an attached configuration with the triggering mechanism.

4. The trigger unit of claim 3, wherein the locking device is one of a screw, a dowel, and a bushing.

5. The trigger unit of claim 1, wherein the strap assembly includes a snap-locking arrangement for attachment to the trigger housing.

6. The trigger unit of claim 5, wherein the snap-locking arrangement includes a locking plate.

7. The trigger unit of claim 6, wherein the locking plate is coupled to a release mechanism.

8. The trigger unit of claim 1, wherein the protective membrane is shaped to conform to the body part of the user.

9. The trigger unit of claim 1, wherein the protective membrane is formed of a self-healing material.

10. The trigger unit of claim 1, wherein the protective membrane is attached directly to the strap assembly.

11. The trigger unit of claim 1, wherein the protective membrane is washable.

12. The trigger unit of claim 1, wherein the protective membrane is detachable from the strap assembly.

13. The trigger unit of claim 1, wherein the protective membrane separates the body part from contact with the trigger housing.

14. The trigger unit of claim 1, wherein the strap assembly comprises an attachment arrangement including at least one rib extending away from the housing and shaped to mate with the trigger housing.

15. The trigger unit of claim 14, wherein the attachment arrangement is configured for attachment to a storage terminal.

16. The trigger unit of claim 1, further comprising a data acquisition device including at least one of an image-based barcode scanner, a laser-based barcode scanner and an RFID reader.

17. A detachable strap assembly for a trigger unit of a wearable device, comprising:
    a strap housing;
    a strap coupled to the strap housing for attaching the trigger unit to a body part of a user, the trigger unit having a trigger housing including a triggering mechanism for triggering a function of the wearable device, the trigger housing being rotatable relative to the wearable device; and
    a protective membrane coupled to the strap housing, the protective membrane comprising a flexible sheet for protecting a the body part of the user.

18. The protective membrane of claim 17, wherein the flexible sheet is formed of a seal-healing material.

19. The protective membrane of claim 17, wherein the flexible sheet is shaped to conform to the body part of the user.

20. The protective membrane of claim 17, wherein the protective membrane is detachable from the strap housing.

21. The protective membrane of claim 17, wherein the protective membrane separates the body part from contact with the trigger unit.

22. A wearable device, comprising:
    a trigger unit including (i) a trigger housing having a triggering mechanism for triggering a function of the wearable device, the trigger housing being rotatable relative to the wearable device, (ii) a strap assembly detachably coupled to the trigger housing and (iii) a protective membrane coupled to the strap assembly for protecting a body part of a user;
    a housing detachably coupled to the trigger unit using a cable, the housing being wearable by the user; and
    a processor situated within the housing, the processor performing the function when the triggering mechanism is activated.

23. The device of claim 22, further comprising:
    a data acquisition arrangement situated at least partially within the housing and coupled to the processor.

24. The device of claim 23, wherein the data acquisition arrangement includes at least one of an image-based barcode scanner, a laser-based barcode scanner and an RFID reader.

* * * * *